(12) United States Patent
Lin

(10) Patent No.: US 8,527,000 B2
(45) Date of Patent: *Sep. 3, 2013

(54) WIRELESS COMMUNICATION SYSTEM FOR MONITORING AND MANAGING CLIENT INTERFACE FOR AREA-SPECIFIC PROCESS

(76) Inventor: Bo-In Lin, Los Altos Hills, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/594,840

(22) Filed: Aug. 26, 2012

(65) Prior Publication Data

US 2012/0323614 A1 Dec. 20, 2012

Related U.S. Application Data

(62) Division of application No. 11/788,635, filed on Apr. 20, 2007.

(51) Int. Cl.
*H04M 1/00* (2006.01)

(52) U.S. Cl.
USPC ............... 455/550.1; 455/557; 455/556.2; 455/556.1; 340/517;340/518; 340/519340/539.1; 340/539.11

(58) Field of Classification Search
USPC ........... 455/550.1, 556.1–557; 340/517–519, 340/539.1, 539.11, 568.5, 4.3, 4.35, 7.28, 340/7.29, 7.3, 7.58, 7.61
See application file for complete search history.

(56) References Cited

U.S. PATENT DOCUMENTS

| | | | | |
|---|---|---|---|---|
| 2004/0059614 A1* | 3/2004 | Brown et al. | | 705/8 |
| 2007/0121534 A1* | 5/2007 | James et al. | | 370/313 |
| 2007/0253595 A1* | 11/2007 | Sorensen | | 382/103 |
| 2008/0032703 A1* | 2/2008 | Krumm et al. | | 455/456.1 |
| 2009/0171701 A1* | 7/2009 | Bertram et al. | | 705/6 |
| 2012/0158441 A9* | 6/2012 | Kane | | 705/5 |

* cited by examiner

*Primary Examiner* — Fayyaz Alam
(74) *Attorney, Agent, or Firm* — Bo-In Lin

(57) ABSTRACT

A method enables a communication between a process client and a wireless process server to carry out an area-specific process in an area. The method includes a step of transmitting it message from a wireless process server to a wireless communication device operated by the process client. The message includes information related to the area-specific process for enabling the process-client to better arrange time before the area-specific process is scheduled to carry out in the area. In a specific embodiment, the wireless communication server sends a message to notify the process client about a location and an estimate time for the process client to carry out the area-specific process. In another preferred embodiment, the communication system enables the process client to employ a wireless communication device owned by the process client.

20 Claims, 4 Drawing Sheets

WIRELESS COMMUNICATION SYSTEM FOR MONITORING AND MANAGING CLIENT INTERFACE FOR AREA-SPECIFIC PROCESS

This Patent Application is a Divisional Application and claims the Priority Date of a co-pending application Ser. No. 11/788,635 filed on Apr. 20, 2007 by a common inventor or this Application. The Disclosures made in the patent application Ser. No. 11/788,635 are hereby incorporated by reference.

BACKGROUND OF THE INVENTION

1. Field of the Invention

This invention relates generally to device and methods for wireless communication. More particularly, this invention is related to a wireless communication system having a wireless communication server to monitor and manage interface with a process client operating a wireless communication device to carry out an area-specific process to enhance the process flow with more effective and timely exchanges of data and information related to the area-specific process.

2. Description of the Prior Art

Even with significant advancements made in technologies and practical applications of wireless telecommunications, it is still a common scene to see customers wait in line. Especially, during a busy shopping season such as within few weeks before annual holidays, the customers are required to wait in line for a prolong length of time before reaching a counter or a checkout station. Such long lines are seen either in the shopping mails or airport terminals.

FIG. 1 shows the typical processes for a passenger to check in an airline when taking an international flight. A passenger starts the processes (step 10) by purchasing a ticket with a reservation for taking an international flight (step 15). The passenger then goes to the international airport terminal on the scheduled date and time to check in with an airline having multiple checking in counters setup in the airport terminal building (step 20). Once entering into the airport terminal building, the passenger goes to a section assigned to the airline with many check in stations (step 25). The passenger then waits in a line until the time when all the passengers before him or her are processed (step 30). Then the passenger walks up to the check in station to present the ticket, the passport and other required documents for the airline worker(s) to complete the check in process including checking in the luggage (step 35). A seat in the airplane is assigned and boarding pass is issued. The passenger has completed the checking in processes and ready to go to a gate for boarding the airplane according to an airplane-boarding schedule (step 40).

Therefore a need still exists to implement a signal transmission and processing configuration to enable message exchanges between a customer and a store or between a passenger and an airline to resolve this difficulty. It is desirable that technologies of wireless communication and location detection by the use of either a global position system (GPS) or other techniques can be effectively applied. It is further desirable that a wireless device user is provided with an option to use the device a user has already own to realize such purposes.

SUMMARY OF THE PRESENT INVENTION

It is therefore an aspect of the present invention to provide a novel signal transmission and processing configuration for enabling message and information exchanges between a customer or passenger and a store or an airline to arrange time and location to reduce the wait-in-line time.

Specifically, it is an aspect of the present invention to provide a wireless communication system for monitoring and managing an area-specific process by a process client in an area. The wireless communication system includes a wireless communication server and a wireless communication device employed by a process client. By timely sending and receiving information and messages between the server and the wireless device, a process client now has information to better arrange time and location to carry out the process. The time required to wait in line can be significantly reduced.

Briefly, in a preferred embodiment, the present invention discloses a wireless coir system for monitoring and managing wireless communications for carrying out an area-specific process in an area. The wireless communication system further includes a wireless communication server for receiving a message from a process client for registering a wireless communication device used by the process client for sending message to and receiving message from the wireless communication server related to ongoing situations and the area-specific process to be carried out in the area. In a preferred embodiment, the communication system further includes a plurality of process stations for carrying out the area-specific processes for the process client wherein the wireless communication server further monitoring a processing state of the process stations for sending message to the wireless communication device to notify the process client of a process station and an approximate time for the process client to carry out the area-specific process. In a preferred embodiment, the wireless communication server further monitoring a location of the process client in the area for sending messages to the wireless communication device to notify the process client of an ongoing situation in the area near the location of the process client. In another preferred embodiment, the communication system further includes a wireless communication server is provided with a function to automatically detect a presence of the process client through detecting an initial presence of the wireless communication device in the area. In another preferred embodiment, the wireless communication server is provided with a function to automatically detect a presence of the process client through detecting an initial presence of the wireless communication device in the area and to automatically register the process client in the wireless communication server for sending message to and receiving message from the wireless communication device related to the ongoing situations and processes to be carried out in the area. In another preferred embodiment, the wireless communication system further includes at least an area-specific dedicated wireless communication device available to the process client to register with the wireless communication server and to use the area-specific dedicated wireless communication device for sending message to and receiving message from the wireless communication server related to ongoing situations and processes to be carried out in the area. In another preferred embodiment, the wireless communication server further store at least a data of a process client as member for using a membership wireless communication device in the area. In another preferred embodiment, the wireless communication system further includes at least a client-owned wireless communication device for registering with the wireless communication server for sending message to and receiving message from the wireless communication server related to ongoing situations and the process to be carried out in the area. In another preferred embodiment, the wireless communication server further receiving and processing a customer estimated process time for monitoring the ongoing situation in the area for sending a message to the wireless communication device to notify the process client of a designated location and time for the customer to carry out the process. In another preferred embodiment, the wireless communication device further including a scanner for scanning a process-related information. The wireless communication server further receives and processes the process-related information from the wireless communication device for preparing to carry out the area-specific process for the process client.

In summary this invention discloses a method for enabling a communication between a process client and a wireless process server. The method includes a step of transmitting a message from the wireless process server to a wireless communication device operated by the process client. The message includes information related to the area-specific process for enabling the process-client to better arrange time before the area-specific process is scheduled to carry out in the area. In a specific embodiment, the wireless communication server sends a message to notify the process client about a location and an estimate time for the process client to carry out the area-specific process. In another preferred embodiment, the communication system enables the process client to employ a wireless communication the owned by the process client.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1:
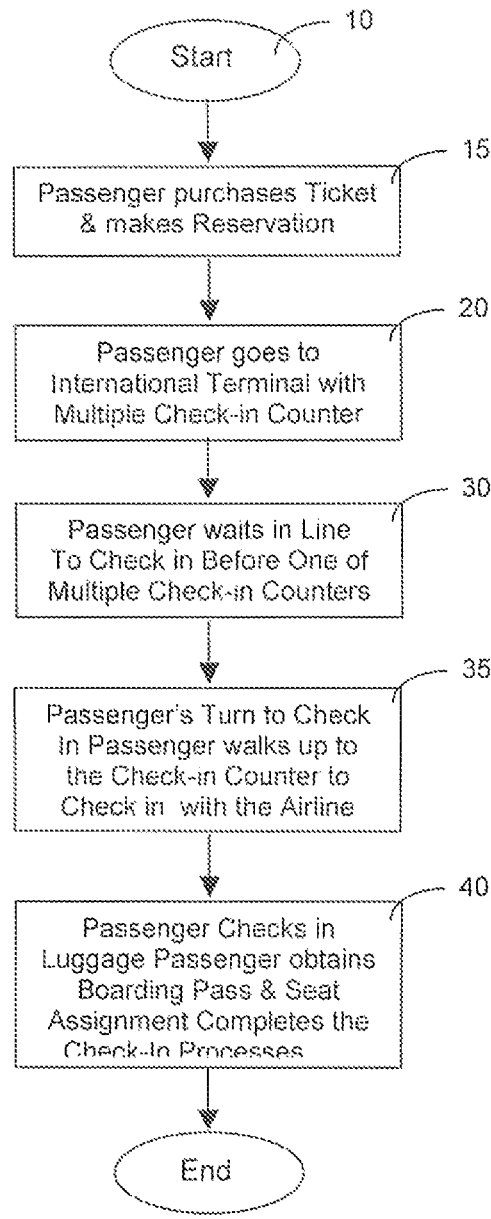
FIG. 1 is as flowchart for showing the conventional processes for an international passenger to check in with an airline before boarding the airplane.
Figure 2:
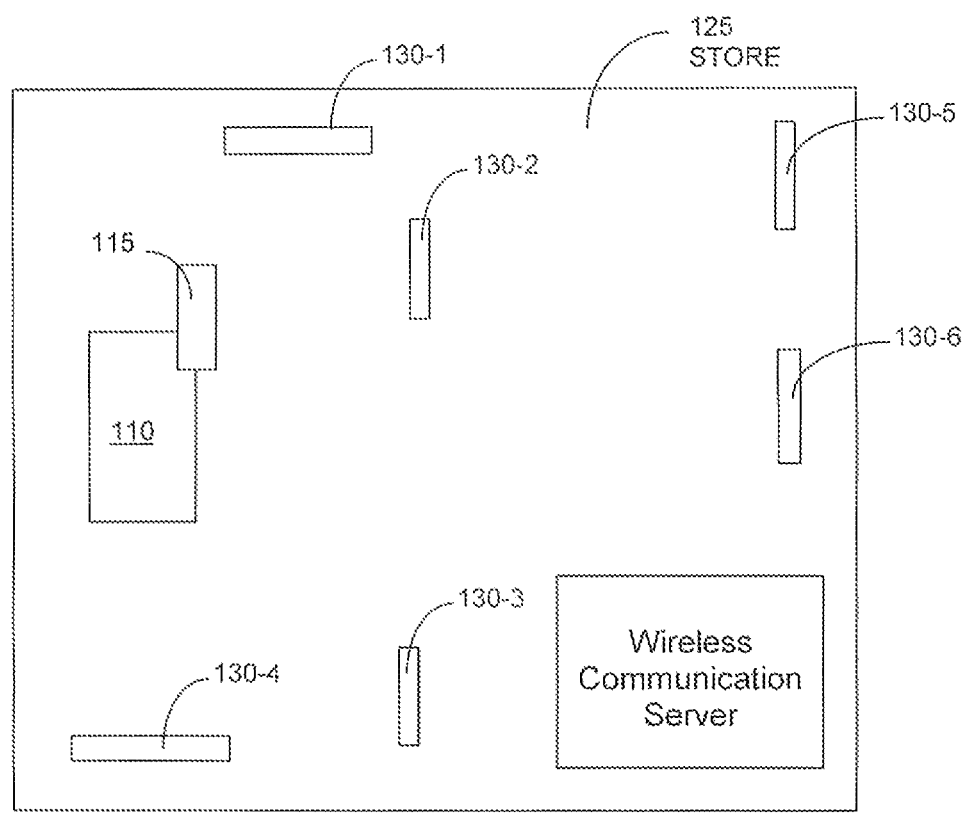
FIG. 2 is functional block diagram for showing an in store wireless communication system of this invention to enable a customer to schedule and reduce the wait time before checking out from the store.

FIG. 2 is a functional block diagram of an in-store wireless communication system 100 to enable the communications between a customer 110 using a wireless communication device 115 and a wireless communication server 120. The communication session starts with a registration of the customer 110 and the wireless communication device 115. The registration process most commonly takes place when the customer 110 first enters into a store 125. Once the registration process is completed, a communication link between the wireless communication server 120 and the customer 110 using the wireless communication device is established. The wireless communication server 120 of a store is provided to send different messages to the communication device 115 to provide different information to the customer 110. The wireless communication server 120 can further detect the location of the customer 110 when the customer is walking and shopping at different places in the store 125. Therefore, the wireless communication server 110 is enabled to send messages to the customer 110 through the wireless communication link with the communication device 115 messages that are relevant to particular locations near the customer at the time during the transmission of the messages.

The wireless communication system may be implemented with an existing cellular communication systems and wireless local area network (LAN) systems. In one embodiment, the invention is a portable communication system that combines the advantages of the cellular wide area coverage with the low cost of Wireless Fidelity (WiFi) Internet telephones. Advantages of the invention include the ability for portable wireless devices to communicate with the wireless communication server via both cellular and WiFi by the least expensive means possible. The result is a cost effective wireless telecommunications network.

Figure 3:
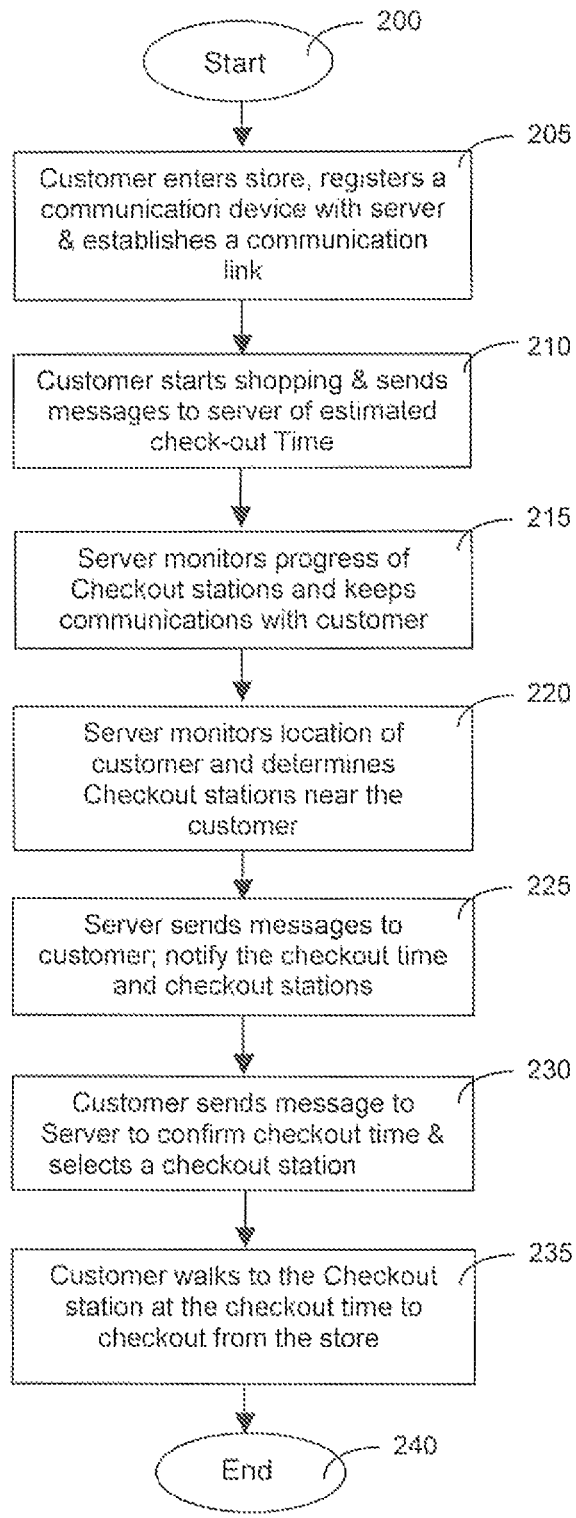
FIG. 3 is flowchart for illustrating the processing steps carried out by the wireless communication server and the customer for completing the shopping and checking out processes.

FIG. 3 is a flowchart for illustrating the steps enabled by the wireless communication system shown in FIG. 2 to achieve time-savings and for the store to provide enhanced services to a customer 110 using the wireless communication device 115. The processes start (step 200) with the customer 110 registers with the wireless communication server 120 to establish a communication session (step 205). The registration step 205 may take place automatically. Automatic registration may happen under the circumstance that the customer 110 carries a wireless communication device such as a cellular phone. Furthermore, the presence of a customer as the cellular phone user in the store is automatically detected by the wireless communication server 120 and recognized as a registered user. The registration may take place through a process that a customer 110 checks out a wireless communication device 115 provided by the store 125. Once a customer checks out a wireless communication device 115, the identification of the customer 110 and the device 115 is registered in the wireless communication server 120 of the store. Alternately, the customer 110 as a user of cellular phone 115 that is not automatically detected by the wireless communication server 120 because the cellular phone 115 is not recognized by the wireless communication server as a user. The customer can also go through a check-in registration process if the cellular phone 115 or any type of wireless communication device carried by the customer 110 can be linked to the wireless communication server 120 for sending and receiving messages.

Once the customer 110 and the wireless communication device 115 are registered with the wireless communication server 130, the customer can start the shopping processes. In the meantime, soon as the customer 110 has an estimated time before the shopping is completed, the customer has an option to send a message to the wireless communication server 120 to indicate an estimated checkout time (step 210). Immediately following the wireless communication server 120 receives a message from the customer 110 for an estimated checkout time, the wireless communication server 120 starts a monitoring process to continuously check a "readiness for check" state for each of the checkout stations (step 215). FIG. 2 shows the distribution of the checkout stations 130-1 to 130-6 distributed at different locations in the store 125. The wireless communication server 120 further monitors the location of the customer 110 in the store 125 (step 220). Five or ten minutes before the estimated checkout time of the customer 110, the wireless communication server 120 sends a message to the wireless communication device 115 (step 225). The message notifies the customer 110 where are the checkout stations near the location of the customer 110 and an estimated ready to checkout time for each of these checkout stations 130-1 to 130-6. Based on the "readiness to checkout" information for these checkout stations, the customer 110 then sends a confirmation message back to the communication server 120 to select a checkout station to check out according to the location and readiness information of these checkout stations 130-1 to 130-6 (step 230). Then the customer 110 takes the items to buy and the wireless communication device 115 to the selected checkout station to process a payment and checkout process (step 235). If the wireless communication device 115 is provided by the store, then the device 115 is returned (Step 240).

In addition to the checkout messages, the wireless communication server 120 can also send other messages, such as special sales or product promotion, to the customer 110. Since the wireless communication server 120 can monitor the location of the customer 110, these messages may be sent at a specific time when the customer is near the locations of these special sales or product promotion. In addition to a function of sending and receiving messages to and from the wireless communication server 120, the wireless communication device 115 may also have a scanning function to scan the bar code of a product or alternately a radio frequency identification (RFID) number. A cellular phone with a camera can easily take a picture of the products with the bar codes shown on these products. The wireless communication device 115 then sends the bar code or RFID numbers to the Wireless communication server 120. The checkout stations 130-1 to 130-6 receive the bar code or RFID numbers and process these data to prepare for the customer 110 to checkout from any one of these checkout stations. A checkout station can achieve faster and smoother checkout process with these data available in advance. Additional service may be available to the customer 110 by allowing the customer to order the products by sending these bar code or RFID numbers to the wireless communication server 120 indicating for picking up at the time of checkout. Message exchanges between the customer 110 and the wireless communication server 120 can then carryout to arrange the checkout time and checkout location. The customer 110 does not have to carry the items to purchase when roaming to different locations of the store 125.

In an alternate preferred embodiment, a store can issue to issue to each member a designated wireless communication device 115 with or without charging a fee to function like a membership card. The wireless communication device 115 then becomes a dedicated device for use in the store 125.

According to FIGS. 2 and 3, and above descriptions this invention discloses a wireless communication system in a shopping area that includes a wireless communication server for receiving a message from a customer for registering a wireless communication device used by the customer for sending message to and receiving message from the wireless communication server related to ongoing situations and transactions to be carried out in the shopping area. In a preferred embodiment, the wireless communication system further includes a plurality of checkout stations for processing a checkout transaction for the customer wherein the wireless communication server further monitoring a processing state of the checkout stations for sending message to the wireless communication device to notify the customer of a checkout station and approximate time for the customer to checkout. In a preferred embodiment, the wireless communication server further monitors a location of the customer in the shopping area for sending messages to the wireless communication device to notify the customer of an ongoing situation in the shopping area near the location of the customer. In a preferred embodiment, the wireless communication server is provided with a function to automatically detect a presence of the customer through detecting an initial presence of the wireless communication device in the shopping area and to automatically register the customer in the wireless communication server for sending message to and receiving message from the wireless communication device related to the ongoing situations and transactions to be carried out in the shopping area. In a preferred embodiment, the wireless communication system further includes at least a shopping-area dedicated wireless communication device available to the customer to register with the wireless communication server and to use the shopping-area dedicated wireless communication device for sending message to and receiving message from the wireless communication server related to ongoing situations and transactions to be carried out in the shopping area. In a preferred embodiment, the wireless communication server further store at least a data of a customer as member for using a membership wireless communication device in the shopping area. In a preferred embodiment, the wireless communication system further includes at least a customer-owned wireless communication device for registering with the wireless communication server for sending message to and receiving message from the wireless communication server related to ongoing situations and transactions to be carried out in the shopping area. In a preferred embodiment, the wireless communication server further receives and processes a customer estimated checkout time for monitoring the ongoing situation in the shopping area for sending a message to the wireless communication device to notify the customer a designated location and time for the customer to check out. In a preferred embodiment, the wireless communication device further includes a product identification code scanner for scanning a product identification code as a purchase item. The wireless communication server further receives and processes the product identification code transmitted from the wireless communication device to prepare a checkout process for the purchase item. In a preferred embodiment, the wireless communication device further includes a product identification code scanner for scanning a product identification code as a purchase item to pickup at checkout. The wireless communication server further receives and processes the product identification code transmitted from the wireless communication device to prepare a checkout process with the purchase item ready for pickup. Alternately, the purchase items as included in the messages sent from the wireless communication device by a customer to the wireless communication server may indicate that the purchase item is for home delivery and the checkout station is prepared to process the check out of the customer for a home delivery process of the purchase items.

Figure 4:
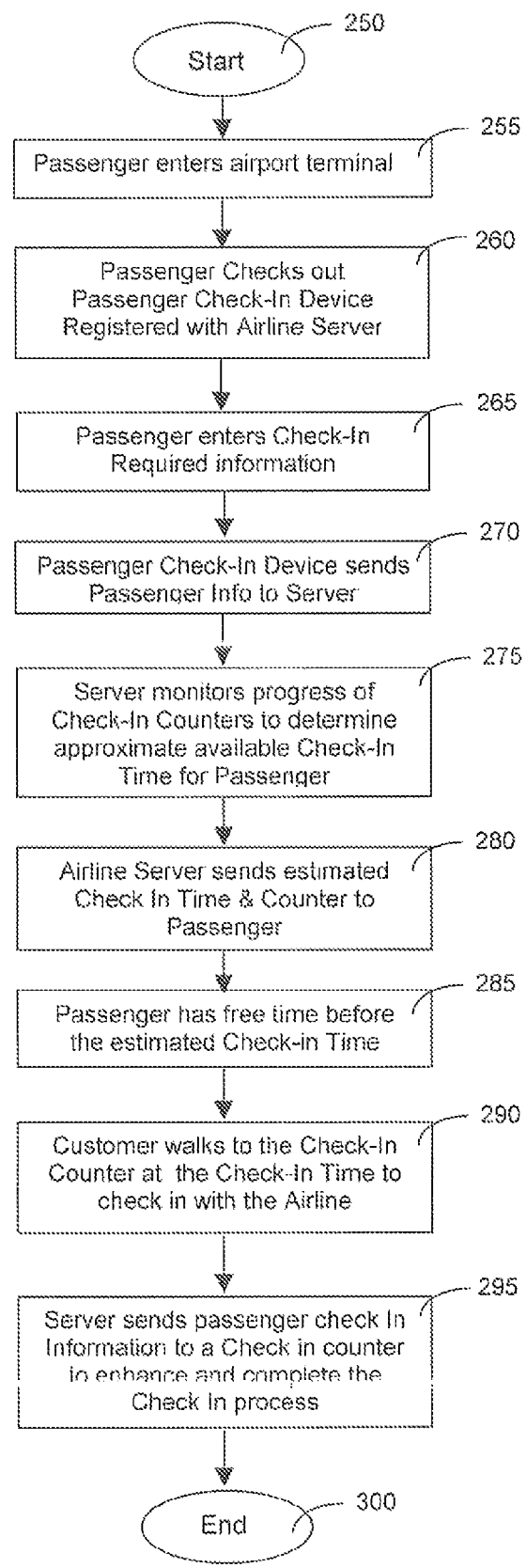
FIG. 4 is flowchart for illustrating the processing steps carried out by an airline wireless communication server and the passenger using a wireless communication device for completing a checking in process with the airline before boarding an airplane.

FIG. 4 illustrates the processing steps to allow an airline passenger to register with an airline to prepare for checking in luggage and person with the airline to board a specific airplane. In FIG. 2, instead of a store 125, the building 125 now represents an airport terminal and the checkout stations now represent airline check-in counters 130-1 to 130-6. In one embodiment, the process starts (step 250) a passenger 110 enters into an airline terminal building 125 (step 255). The passenger 110 checks out a "wireless passenger check-in device" 115 by using an airline ticket, a reservation "locator ID" or any other numbers or codes recognized by an airline wireless checking server 120 (step 260). The passenger 110 then uses the wireless checking device 115 to enter information related to the checking process (step 265). The information may include a number of bags to be checked, passport and visa number, etc. The wireless check-in device 115 may include a scanner to scan an image of the passport and visa if necessary and the bags to be checking in. The passenger checking in device 115 sends the passenger information and data to the airline wireless checking-in server 120 (step 270). In the meantime, the airline wireless checking-in server 120 monitor the progress of different checking in stations 130-1 to 130-6 to determine an approximate "ready to check in" time for the passenger 110 (step 275). The airline wireless checking in server 120 then sends the approximate "ready to check in" time to the passenger 110 via the wireless checking in device 115 (step 280). Once the passenger 110 receives this estimated "ready to check in" time, the passenger is not restricted to wait in line before one of the checking in stations. The passenger has total freedom of movement either within the airport terminal 125, or even beyond the airport terminal if then are sufficient time for the passenger to move outside of the terminal and come back within certain time before the "ready to check in" time (step 285). At a specific time, the airline wireless checking-in server 120 sends messages to the passenger 110 to provide a notification for the passenger to go to a designated checking in station at particular time (step 290). Meanwhile, the airline wireless checking-in server 120 sends the passenger's checking-in related information and data to the designated checking-in station to expedite the checking process (step 295) before the processing is ended (step 300).

In an alternate embodiment, the regular cellular phone or any mobile communication devices, such as a network connected personal digital assistance (PDA) may also be used to communicate with the airline wireless checking-in server 120. In a different embodiment, the passenger may pre-register with the airline wireless checking-in server 120 the passenger's approximate arrival time to an airport terminal and the number of the wireless communication device used by the passenger 110. In this pre-registration process, the passenger may also send the checking-in related information to the airline server 120. According to the data and information, the airline server can communicate with the passenger 110 via the wireless communication device 115 to provide notification about time and the designated checking-in station for the passenger to check in at approximately a time slot. The passenger 110 as a customer does not have to wait in line before a check-in station for the airline personnel to handle the check in process on a checking in station.

According to FIGS. 2 and 4, this invention discloses a wireless communication system in an airport area. The wireless communication system includes a wireless communication server for receiving a message from a passenger for registering a wireless communication device used by the passenger for sending message to and receiving message from the wireless communication server related to ongoing situations and passenger checking in processes to be carried out in the airport area. Specifically, the wireless communication system in the airport further includes a plurality of airline check-in counters for handling a passenger check in process of the passenger. The wireless communication server further monitoring a processing state of the airline check in counter for sending message to the wireless communication device to notify the passenger of a check in counter and an approximate time for the passenger to check in at the check in counter.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A passenger management communication system comprising:
    a networked communication server for communicating with a passenger through a passenger's wireless communication device by sending an estimated check-in time to the passenger in an airport depending an arrival time of the passenger to the airport whereby the passenger is not required to wait-in-line to check in a flight before the estimated check-in time.

2. The passenger management communication system of claim 1 wherein:
    the networked communication server further communicates with the passenger when the passenger arrives at the airport and is in an airport terminal for checking in the flight.

3. The passenger management communication system of claim 1 wherein:
    the networked communication server further communicates with the passenger before the passenger arrives at the airport.

4. The passenger management communication system of claim 1 wherein:
    the networked communication server further communicates with the passenger before the passenger arrives at the airport based on an estimated time for the passenger to arrive at the airport.

5. The passenger management communication system of claim 1 wherein:
    the networked communication server further detecting the passenger arriving at an airport terminal by detecting a signal of the passenger's wireless communication device.

6. The passenger management communication system of claim 1 wherein:
    the networked communication server further communicates with the passenger to go to a designated check in counter in the airport for checking in the flight.

7. The passenger management communication system of claim 1 wherein:
    the networked communication server further communicates with the passenger about a changed estimated time to go to a check in counter in the airport for checking in the flight when the estimated check-in time is changed.

8. A method for managing a passenger's checking process in an airport comprising:
    implementing a networked communication server for communicating with a passenger through a passenger's wireless communication device by sending an estimated check-in time to the passenger in an airport depending an arrival time of the passenger to the airport whereby the passenger is not required to wait-in-line to check in a flight before the estimated check-in time.

9. The method of claim 8 wherein:
    the step of communicating with the passenger further comprising a step of communicating with the passenger when the passenger arrives at the airport.

10. The method of claim 8 wherein:
    the step of communicating with the passenger further comprising a step of communicating with the passenger before the passenger arrives at the airport.

11. The method of claim 8 wherein:
    the step of communicating with the passenger further comprising a step of communicating with the passenger before the passenger arrives at the airport based on an estimated time for the passenger to arrive at the airport.

12. The method of claim 8 further comprising:
  detecting the passenger arriving at an airport terminal by detecting a signal of the passenger's wireless communication device.

13. The method of claim 8 wherein:
  the step of communicating with the passenger further comprising a step of communicating to go to a designated check in counter in the airport for checking in the flight.

14. The method of claim 8 wherein:
  the step of communicating with the passenger further comprising a step of communicating with the passenger about a changed estimated time to go to a check in counter in the airport for checking in the flight when the estimated check-in time is changed.

15. The passenger management communication system of claim 1 wherein:
  the networked communication server further communicates with the passenger through an airline's wireless communication device when the passenger is in an airport terminal for checking in the flight.

16. The passenger management communication system of claim 1 wherein:
  the networked communication server further communicates with the passenger through an airline's wireless communication device before the passenger arrives at the airport.

17. The passenger management communication system of claim 1 wherein:
  the networked communication server further communicates with the passenger through an airline's wireless communication device before the passenger arrives at the airport based on an estimated time for the passenger to arrive at the airport.

18. The passenger management communication system of claim 1 wherein:
  the networked communication server further detecting the passenger arriving at an airport terminal by detecting a signal of the airline's wireless communication device.

19. The passenger management communication system of claim 1 wherein:
  the networked communication server further communicates with the passenger through an airline's wireless communication device to go to a designated check in counter in the airport for checking in the flight.

20. The passenger management communication system of claim 1 wherein:
  the networked communication server further communicates with the passenger through an airline's wireless communication device about a changed estimated time to go to a check in counter in the airport for checking in the flight when the estimated check-in time is changed.

* * * * *